United States Patent [19]

Talamantez

[11] E Re. 28,936

[45] Reissued Aug. 24, 1976

[54] CART WITH AUTOMATIC POSITIONING HANDLE AND INDEPENDENTLY POSITIONABLE WHEELS

[76] Inventor: Rudolph Talamantez, 9 Oldham Road, Silver Spring, Md. 20901

[22] Filed: Mar. 12, 1975

[21] Appl. No.: 557,540

Related U.S. Patent Documents

Reissue of:

[64] Patent No.: 3,724,863
Issued: Apr. 3, 1973
Appl. No.: 107,221
Filed: Jan. 18, 1971

[52] U.S. Cl. ..... 280/5.2; 280/5.28; 280/47.21

[51] Int. Cl.[2] ..... B62B 3/22

[58] Field of Search ..... 280/5.2, 6 R, 47.31, 280/5.28, 47.21, 47.23, 47.27

[56] References Cited

UNITED STATES PATENTS

| | | | |
|---|---|---|---|
| 2,123,707 | 7/1938 | Bloch | 280/5.2 UX |
| 3,052,480 | 9/1962 | Sanstrom | 280/6 R |
| 3,350,797 | 11/1967 | Dassinger et al. | 280/5.2 |

FOREIGN PATENTS OR APPLICATIONS

| | | | |
|---|---|---|---|
| 57,893 | 4/1953 | France | 280/47.31 |
| 886,929 | 7/1943 | France | 280/47.31 |
| 64,822 | 10/1892 | Germany | 280/47.31 |
| 312,337 | 11/1933 | Italy | 280/5.2 |

*Primary Examiner*—M. H. Wood, Jr.
*Assistant Examiner*—John A. Pekar
*Attorney, Agent, or Firm*—Jay M. Cantor

[57] ABSTRACT

The disclosure relates to a cart or pick-up truck capable of transporting a load on level ground, hills and inclines and up stairways and the like wherein the operator thereof is capable of maintaining a constant erect position during operation, regardless of the contour of the terrain over which the cart is driven. The cart includes a frame having a rotatable upward handle portion, the handle portion being rotatable in a direction away from and toward the operator and having a stop when rotated in a direction toward the operator so that the rotatable portion of the handle is never rotated to the point where it is coaxial with the remaining portion of the frame. The cart also includes a pair of individually rotatable wheels, each wheel having a rotatable shaft whereby the wheels individually seek their own level, depending upon the terrain over which the cart is pulled or pushed.

16 Claims, 8 Drawing Figures

Inventor
RUDOLPH TALAMANTEZ

By:

Inventor
RUDOLPH TALAMANTEZ

By: [illegible]

Inventor
RUDOLPH TALAMANTEZ

By: Jary M Cantor

CART WITH AUTOMATIC POSITIONING HANDLE AND INDEPENDENTLY POSITIONABLE WHEELS

Matter enclosed in heavy brackets [ ] appears in the original patent but forms no part of this reissue specification; matter printed in italics indicates the additions made by reissue.

This invention relates to carts or pick-up trucks and, more specifically to a cart or pick-up truck having a handle portion which is partially rotatable and a set of wheels which are individually positionable as to height and capable of constant change of height in order to allow the operator to drive the cart or truck on terrain of varying levels, inclines, stairs and the like while walking in an erect position when pushing or pulling same.

Carts or hand trucks have been well known in the art and have found great use therein. Some examples of prior art carts or hand trucks are shown in the patents to Hall (U.S. Pat. No. 1,201,957), Burch (U.S. Pat. No. 2,485,085), Blouin (U.S. Pat. No 2,739,721), Westberg (U.S. Pat. No. 2,869,887) and Uribe (U.S. Pat. No. 3,247,989). While carts or hand trucks of the prior art have performed the function for which they are intended, such devices have been difficult to operate when the terrain is not level such as in going over inclines or in cases where the wheels are at different levels, or in the case of carrying the load on the truck up a set of stairs. In addition, the operator of the prior art carts or hand trucks was often required to bend his body in order to properly push or pull the truck, this causing severe back problems and the like in many cases.

In accordance with the present invention, the above problems which exist in the prior art carts or hand trucks are overcome. Briefly, this is accomplished by the use of a handle attached to the frame of the cart or truck which is capable of rotation in a direction toward and away from the operator but which is always at an angle with respect to the frame of the truck, the angle being acute and the rotatable handle portion always being on the side away from the operator. In addition, the truck includes a pair of wheels, each wheel being individually rotatable and each wheel shaft being individually rotatable by an L-shaped member which is attached and rotatable about a shaft common to the two wheels to allow each wheel to rotate independently and maintain or seek its own operating height or level independently.

It is therefore an object of this invention to provide a cart or hand truck capable of operation at a wide range of angles of inclination wherein the operator operates same while standing in an erect position.

It is a further object of this invention to provide a cart or hand truck capable of operation on flat terrain or terrains of various other shapes as well as stairs wherein the cart or truck operator is constantly in an erect position.

It is a still further object of this invention to provide a cart or hand truck having wheels capable of independently assuming different and constantly varying positions in response to variations in the terrain therebelow.

The above objects and still further objects of this invention will immediately become apparent to those skilled in the art after consideration of the following preferred embodiment thereof which is provided by way of example and not by way of limitation, wherein.

Figure 1:
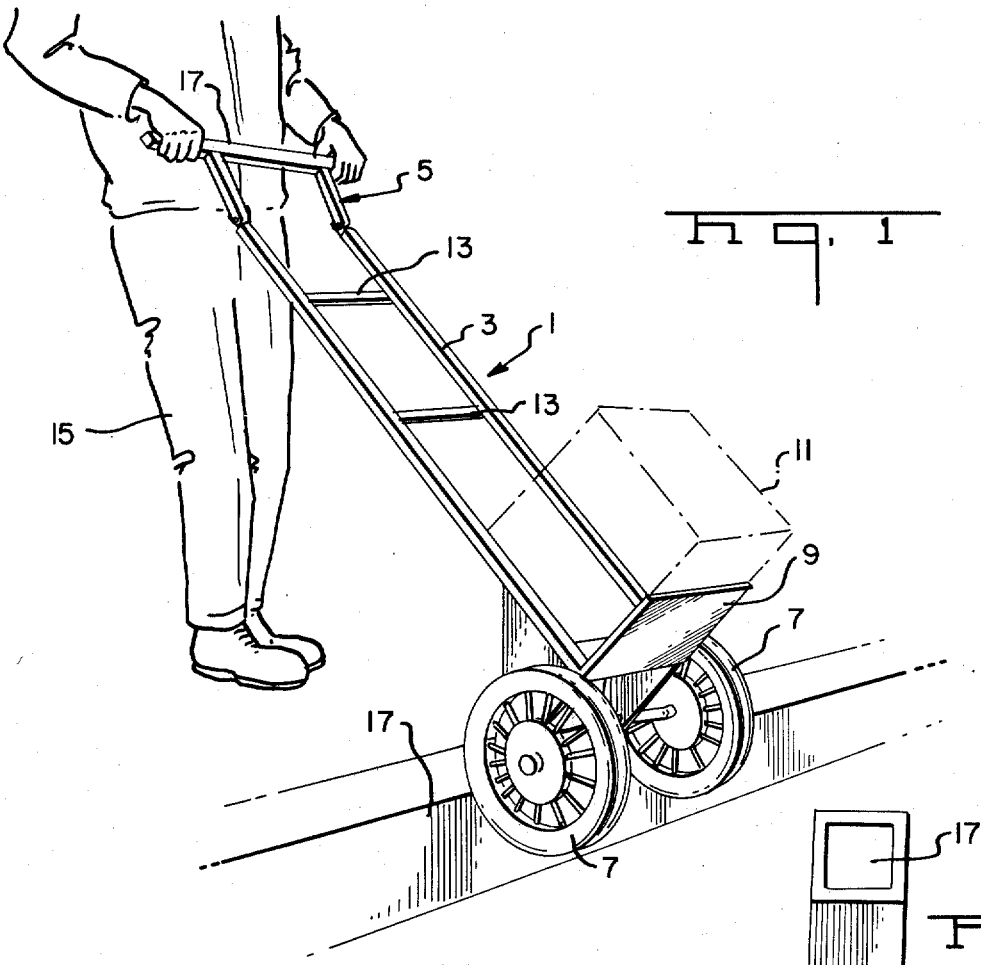
FIG. 1 is a view in elevation of a cart or hand truck in accordance with the present invention.

Referring now to FIG. 1 there is shown a cart or hand truck 1 having a body portion or frame 3, a handle 5, wheels 7 and a platform 9 for supporting a load 11. The frame 3 has a plurality of cross members 13 to provide extra strength. The wheels 7 are mounted on an axle system which will be described in detail hereinbelow. An operator 15 is shown in erect position operating the cart over a curb 17.

Figure 2:
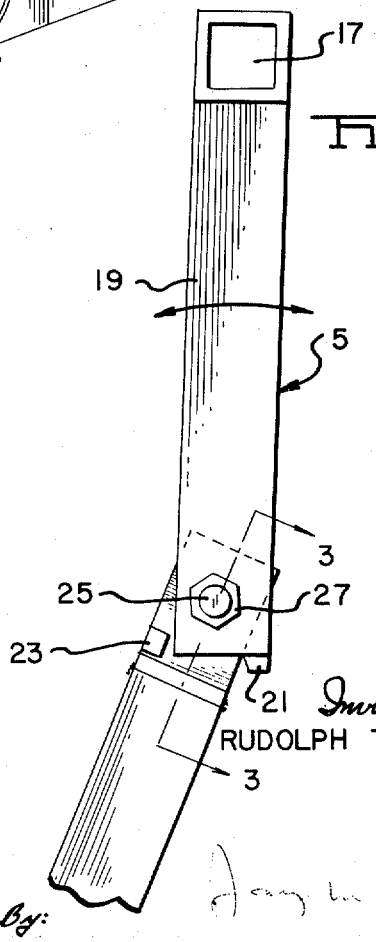
FIG. 2 is a side view of the handle and a portion of the frame in accordance with the present invention.
Figure 3:
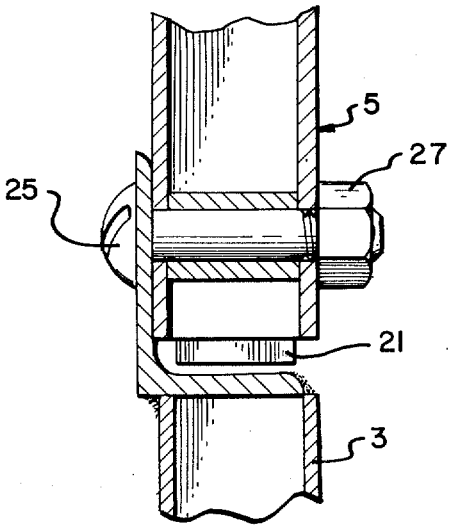
FIG. 3 is a view along the line 3—3 of FIG. 2.

Referring now to FIG. 2, there is shown the handle portion 5 and a part of the frame 3 with the interlocking mechanism as will be described in detail. The handle mechanism 5 includes a handle portion 17 which is rotatable as shown by the arrows in FIG. 2. The handle mechanism has side members 19, each member 19 having a downwardly extending flange portion 21 on the side closest the operator. The frame portion 3 also has a stop mechanism 23 against which the side member 19 abuts when rotated in a clockwise direction sufficiently. The handle portion 5 is secured to the frame 3 as best shown in FIG. 3 by means of a nut 25 and bolt 27 which pass through both the members 3 and 5 through an aperture in each. The members 3 and 5 are rotatable relative to each other about the nut and bolt 25 and 27.

Figure 4:
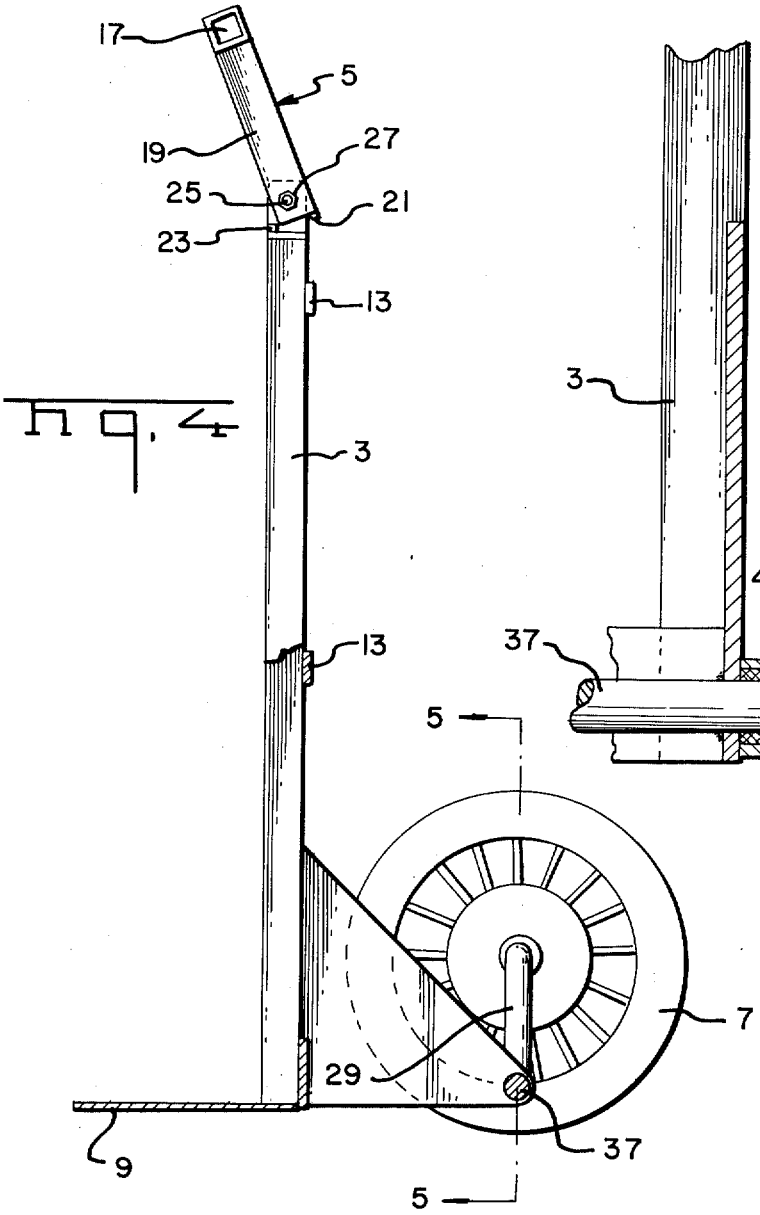
FIG. 4 is a side view of the cart or hand truck in accordance with the present invention resting in a vertical position.
Figure 5:
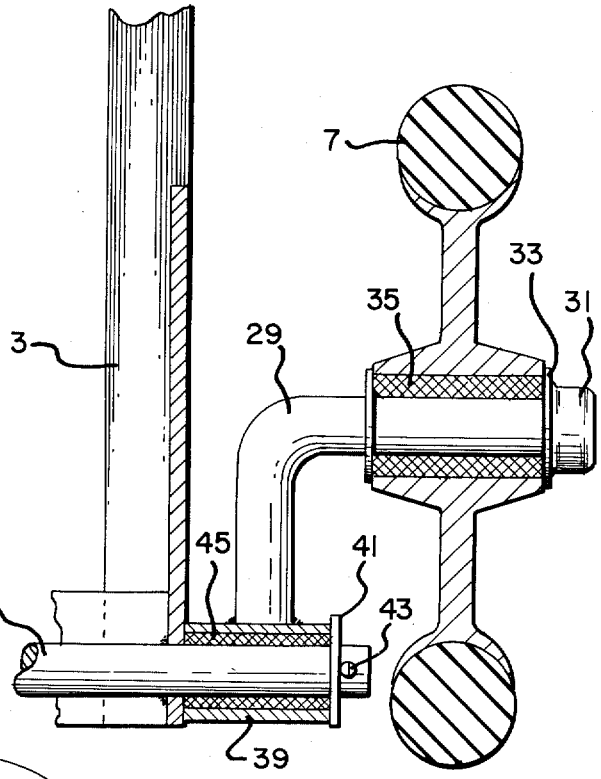
FIG. 5 is a view along the line 5—5 of FIG. 4.
Figure 8:
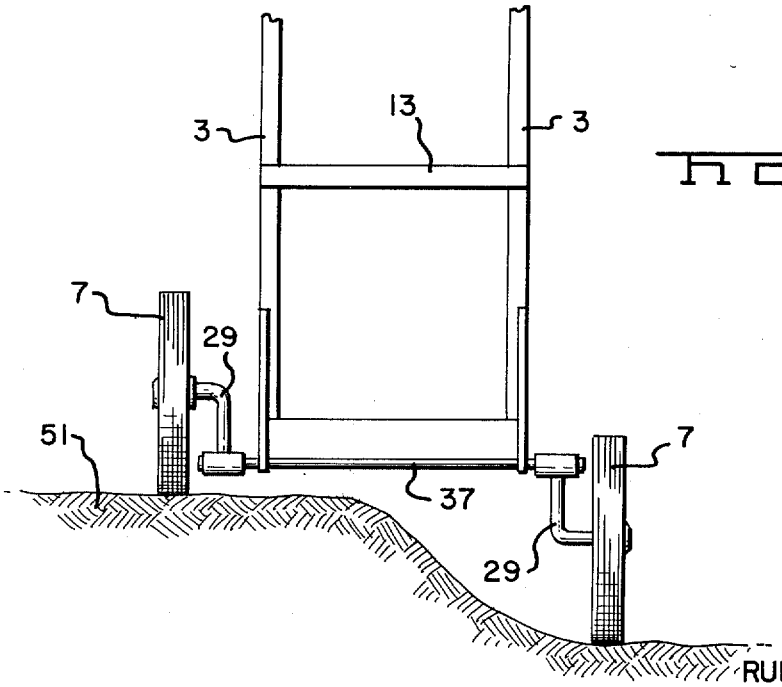
FIG. 8 is a front view of the lower portion of the cart or hand truck as the wheels would appear when being operated over terrain of two different levels.

Referring now to FIGS. 4 and 5, there is shown the cart or hand truck in a vertical position resting on the load support or platform 9 and the wheels 7. The wheels 7 are attached to the frame 3 via an L-shaped lever 29 with one portion of the L extending through the center of the wheel 7 and being secured thereto by a cap 31 or the like and a washer 33 between the wheel and the cap 31. A bearing 35 is positioned about the lever portion 29 passing through the wheel to provide easy rotation of the wheel about the lever. The lever 29 is also rotated about a shaft or axle 37 extending through the frame 3 and passing through both of the wheels 7 as best shown in FIG. 8. The axle 37 extends outwardly beyond both ends of the frame 3 and through sleeve 39 attached to the other portion of the lever 29 by welding or the like. The shaft 37 is secured within the sleeve 39 by means of a washer 41 and a pin or the like 43 extending through an aperture in the shaft 37. The sleeve 39 is rotatable about the shaft 37 over a bearing 45 positioned over the shaft 37 and beneath the sleeve 39. It can be seen that this arrangement will allow the lever 29 to rotate about the shaft 37 independently of the movement of the wheels 7. Likewise, the wheels 7 can rotate about the lever 29 independently of movement about the shaft 37. The lever 29 is capable of 360° rotation about the shaft 37.

Figure 6:
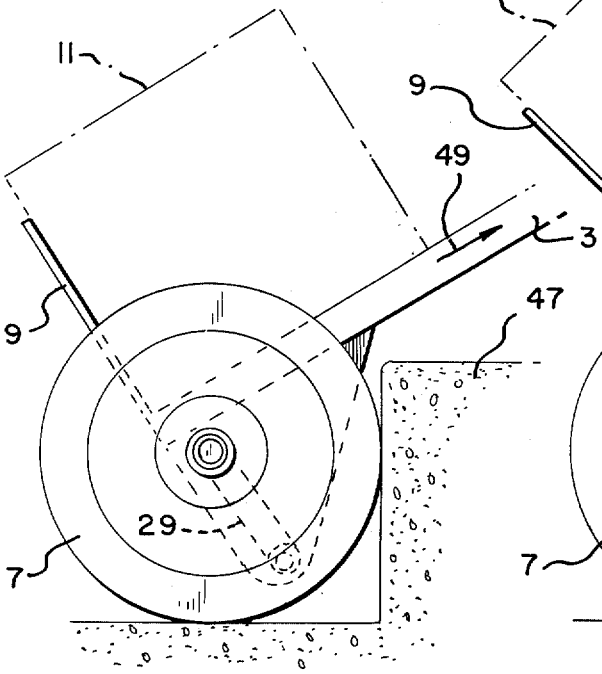
FIG. 6 is a side view of the bottom portion of the cart or hand truck in accordance with the present invention prior to lifting same up a stair.
Figure 7:
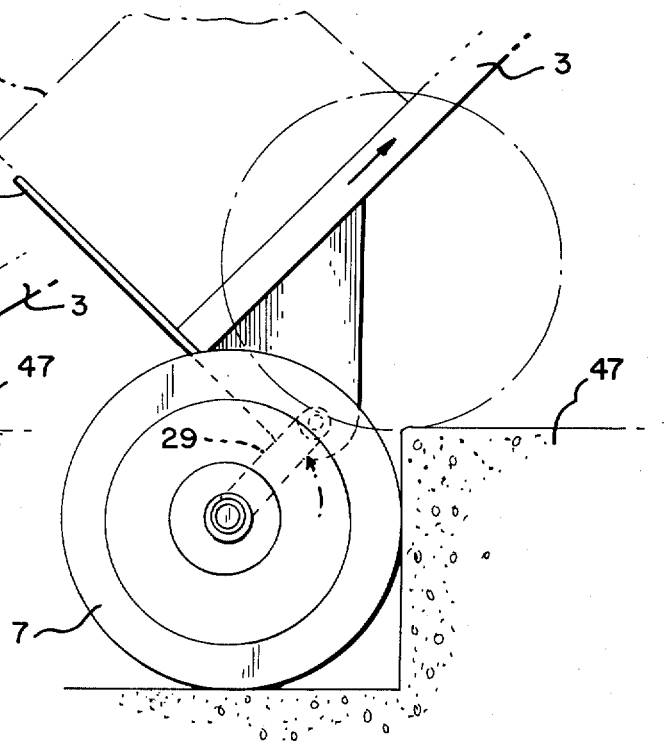
FIG. 7 is a side view of the cart or hand truck of the present invention with the truck shown when the wheels are about to rotate to the next level of the stairway.

Referring now to FIG. 6, there is shown a cart or hand truck in accordance with the present invention showing the position that would be taken prior to pulling the same over a step 47. It can be seen that the cart or hand truck frame will be moved along the path of the arrow on the frame, the lever 29 being positioned in a substantially downwardly extending position. As a force is provided along the arrow 49, the lever 29 will rotate about the shaft 37 in the direction of the arrow in FIG. 6 so that it is in a somewhat vertically extending position as best shown in FIG. 7. From this position, the wheels 7 will rotate upwardly in the direction of the arrow in FIG. 7 over the step 47 to the position as shown in dotted lines in FIG. 7 It can be seen that in this form of operation the angle of the frame 3 remains constant, thereby allowing the operator to operate the cart or hand truck without changing from erect or standing position.

Referring now to FIG. 8 there is shown the operation of the cart or hand truck in accordance with the present invention when operating same over terrain of varying heights. It can be seen that the terrain 51 has a higher level to the left of FIG. 8 and a lower level to the right of FIG. 8. Accordingly, the wheels 7 will rotate in normal manner, however the levers 29 will rotate about the shaft 37 in order to provide the cart with the upright position as shown in FIG. 8. It can be seen that the left hand wheel has been positioned whereby the lever 29 extends upwardly whereas the right hand lever extends downwardly, each lever having taken its position independently of the other.

Though the invention has been described with respect to a preferred embodiment thereof, many variations and modifications thereof will immediately become apparent to those skilled in the art. It is therefore the intention that the appended claims be interpreted as broadly as possible in view of the prior art to include all such variations and modifications.

What is claimed is:

1. A hand truck comprising a substantially upright frame member extending in a plane, a platform extending from the lower end of the frame member transversely to said plane, a pair of wheels, means mounting the wheels on the lower end of the frame member for respective independent rotation about axes parallel to said plane on the side opposite to that on which the platform is located, a handle pivoted to rotate freely on the upper end of the frame about an axis parallel to the wheel axes, and stop means on the frame and handle for confining pivotal movement of the handle to a position above the platform.

2. A hand truck in accordance with claim 1 in which the means mounting the wheels for rotation on the frame each comprises an arm mounted at one end on the frame member for respective independent 360° rotation about a first axis, each wheel being mounted at its center on the other end of the arm for rotation about a second axis.

3. A hand truck in accordance with claim 2 in which the first axis of each arm is on the other side of the frame member and spaced therefrom, said first axis passing through support means located on the other side of the frame member and extending transversely therefrom.

*4. A hand truck comprising:*

*a. a body member,*

*b. a first and second wheel*

*c. first means secured to said body member for mounting said first wheel for rotation said first means including*

*d. a first axle member secured to said body member and having a first predetermined axis,*

*e. a second axle member secured to said first axle member for continuous 360° rotation about a circular path, the plane of said circular path being normal to said first predetermined axis, said first predetermined axis being on a line passing through the center of said circular path,*

*f. said wheel being mounted on said second axle member for 360° rotation therearound*

*g. said second axle member of said first means secured to said body for rotation in said circular path independently of rotation of said first axle member associated therewith,*

*h. second means secured to said body member for mounting said second wheel for rotation, said second means including*

*i. a third axle member secured to said body member and having a third predetermined axis,*

*j. a fourth axle member secured to said third axle member for continuous 360° rotation about a circular path, the plane of said circular path being normal to said third predetermined axis, said third predetermined axis being on a line passing through the center of said circular path,*

*k. said wheel being mounted on said fourth axle member for 360° rotation therearound*

*l. said fourth axle member of said second means secured to said body for rotation in said circular path independently of rotation of said third axle member associated therewith.*

*5. A hand truck as set forth in claim 4 wherein said first predetermined axis and said third predetermined axis lie along the same line.*

*6. A hand truck as set forth in claim 5 wherein said first axle member and said second axle member are integral with each other.*

*7. A hand truck as set forth in claim 6 wherein at least some of the planes of rotation of each of the circular paths are each spaced from said first and third axle members.*

*8. A hand cart as set forth in claim 7 wherein said second and fourth axles each include an elbow portion at an angle with the axes of said second and fourth axles respectively, and bearing means secured around each of said first and third axles respectively, said bearing means also being secured to each of said elbow portions respectively.*

*9. A hand truck as set forth in claim 5 wherein at least some of the planes of rotation of each of the circular paths are each spaced from said first and third axle members.*

*10. A hand cart as set forth in claim 9 wherein said second and fourth axles each include an elbow portion at an angle with the axes of said second and fourth axles respectively, and bearing means secured around each of said first and third axles respectively, said bearing means also being secured to each of said elbow portions respectively.*

*11. A hand truck as set forth in claim 4 wherein at least some of the planes of rotation of each of the circular paths are each spaced from said first and third axle members.*

*12. A hand cart as set forth in claim 11 wherein said second and fourth axles each include an elbow portion at an angle with the axes of said second and fourth axles respectively and bearing means secured around each of said first and third axles respectively, said bearing means also being secured to each of said elbow portions respectively.*

*13. A hand truck comprising:*

*a. a body member,*

*b. a wheel, and*

*c. means secured to said body member for mounting said wheel for rotation, said means including*

*d. a first axle member secured to said body member and having a first predetermined axis,*

*e. a second axle member secured to said first axle member for continuous 360° rotation about a circular path, the plane of said circular path being normal to said first predetermined axle, said first predetermined axis being on a line passing through the center of said circular path,*

*f. said wheel being mounted on said second axle for 360° rotation therearound, wherein said second axle includes an elbow portion at an angle with the axis of said second axle and bearing means secured around said first axle for 360° continuous rotation therearound, said bearing means also being secured to said elbow.*

*14. A hand truck comprising:*

*a. a body member,*

*b. a first and second wheel*

*c. first means secured to said body member for mounting said first wheel for rotation and second means secured to said body member for mounting said second wheel for rotation, said first and second means each including*

*d. a first axle member secured to said body member and having a first predetermined axis,*

*e. A second axle member secured to said first axle member for continuous 360° rotation about a circular path, the plane of said circular path being normal to said first predetermined axis, said first predetermined axis being on a line passing through the center of said circular path,*

*f. each said wheel being mounted on said second axle member for 360° rotation therearound, wherein said second and fourth each include an elbow portion at an angle with the axis of said second and fourth axles respectively, and bearing means secured around each of said first and third axles respectively, said bearing means also being secured to each of said elbow portions respectively.*

*15. A hand truck as set forth in claim 14 wherein said first predetermined axis and said third predetermined axis lie along the same line.*

*16. A hand truck as set forth in claim 15 wherein said first axle member and said second axle member are integral with each other.*

* * * * *